United States Patent
Ladner et al.

(10) Patent No.: US 10,782,028 B2
(45) Date of Patent: Sep. 22, 2020

(54) GLASS ON OUTSIDE OF RANGE DOOR

(71) Applicants: BSH Home Appliances Corporation, Irvine, CA (US); BSH Hausgeräte GmbH, Munich (DE)

(72) Inventors: Robert Ladner, Knoxville, TN (US); Rose Marie Parker, Caryville, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 219 days.

(21) Appl. No.: 15/813,196

(22) Filed: Nov. 15, 2017

(65) Prior Publication Data

US 2019/0145628 A1    May 16, 2019

(51) Int. Cl.
| | |
|---|---|
| *F24C 15/04* | (2006.01) |
| *F24C 15/02* | (2006.01) |
| *F16B 11/00* | (2006.01) |
| *C09K 5/18* | (2006.01) |
| *A47J 36/28* | (2006.01) |
| *A23L 5/10* | (2016.01) |
| *B65D 81/34* | (2006.01) |
| *F24V 30/00* | (2018.01) |

(52) U.S. Cl.
CPC .......... *F24C 15/021* (2013.01); *F16B 11/006* (2013.01); *F24C 15/04* (2013.01)

(58) Field of Classification Search
CPC ......... F24C 15/023; F24C 15/04; F23D 23/02

USPC ......................................................... 126/200
See application file for complete search history.

(56) References Cited

U.S. PATENT DOCUMENTS

| | | | |
|---|---|---|---|
| 2,679,468 A | 5/1954 | Pitman | |
| 3,731,035 A * | 5/1973 | Jarvis | H05B 6/6414 219/740 |
| 3,821,052 A | 6/1974 | Tanzer | |
| 3,877,460 A * | 4/1975 | Lotz | F24C 15/04 126/200 |
| 4,007,727 A * | 2/1977 | Krebs | F24C 15/04 126/200 |
| 4,008,383 A | 2/1977 | Tanaka et al. | |
| 4,215,258 A | 7/1980 | Nelson et al. | |
| 4,984,839 A * | 1/1991 | Miyakawa | B60J 1/2002 296/208 |

(Continued)

FOREIGN PATENT DOCUMENTS

| | | | |
|---|---|---|---|
| DE | 1225867 A1 | 2/1994 | |
| GB | 2410325 A * | 7/2005 | ......... F24C 15/04 |
| WO | 2006103086 A1 | 10/2006 | |

*Primary Examiner* — Edelmira Bosques
*Assistant Examiner* — Nikhil P Mashruwala
(74) *Attorney, Agent, or Firm* — Michael E. Tschupp; Andre Pallapies; Brandon G. Braun

(57) ABSTRACT

Techniques are provided for constructing an appliance door having a metal-to-metal-to-glass bond. In one or more implementations a glass panel is mounted to a door skin of a door panel, the door skin having multiple slots. Adhesive is applied to the side of the door skin opposite the glass panel along a path created by the multiple slots. Afterwards, a metal frame is placed on the adhesive creating a metal-to-metal-to-glass bond with increased structural strength and a reduced gap between the glass and metal of the door panel.

6 Claims, 2 Drawing Sheets

(56) References Cited

U.S. PATENT DOCUMENTS

| | | | | |
|---|---|---|---|---|
| 5,527,083 | A * | 6/1996 | Kreye | E06B 3/56 |
| | | | | 296/146.15 |
| 5,789,724 | A * | 8/1998 | Lerssen | H05B 6/766 |
| | | | | 126/200 |
| 7,703,451 | B2 * | 4/2010 | Bang | F24C 15/022 |
| | | | | 126/190 |
| 7,819,113 | B2 * | 10/2010 | Chin | F24C 15/04 |
| | | | | 110/112 |
| 9,115,903 | B2 * | 8/2015 | Lim | F24C 15/04 |
| 2009/0255524 | A1 * | 10/2009 | Venezia | F24C 15/024 |
| | | | | 126/198 |
| 2013/0097937 | A1 | 4/2013 | Flasher | |
| 2015/0245422 | A1 * | 8/2015 | Himmelein | H05B 6/763 |
| | | | | 219/740 |
| 2016/0209047 | A1 * | 7/2016 | Hildner | F24C 15/045 |
| 2019/0215917 | A1 * | 7/2019 | Huang | F24C 7/02 |

* cited by examiner

GLASS ON OUTSIDE OF RANGE DOOR

FIELD OF TECHNOLOGY

The present technology relates to improvements in appliance door construction.

BACKGROUND

Glass on an appliance door, for example glass on an oven door or a range door, is traditionally mounted on the interior of the door. Methods for mounting glass on the interior of the door traditionally use a variety of gluing and taping methods.

However, when mounting glass on the exterior of an appliance door, these traditional methods are insufficient. Tape, regardless of thickness, can result in a gap between the door skin and the glass. This gap creates potential complications via increased heat loss, cleaning issues, and potential pinch points for a user's hand where it can get caught between the door skin and the glass.

In contrast, using glue to mount glass on the exterior of the appliance door results in less of a gap between the door skin and the glass, however, controlling the bead position of the glue during assembly is a challenge, and seepage of the glue outside of the glass is a possibility.

Both of these traditional methods (glue and tape) also create a metal-to-glass adhesion. While this is acceptable for glass mounted on the interior of an appliance door, glass mounted to the exterior of an appliance door will be subject to stronger forces and cannot rely on an adhesive alone for bonding strength.

Accordingly, what is needed is a way to quickly and easily mount glass to the exterior of an appliance door that results in no discernible gap between the glass and the appliance door while increasing the strength of the finished door.

BRIEF SUMMARY

The present invention is directed to improvements in appliance door construction, in particular regarding appliance doors with glass mounted to the exterior of the door. This is accomplished by cutting slots in the door skin of an appliance door, placing the glass on the exterior side of the door skin, applying an adhesive to the backside of the door skin along the path of the slots, and applying a metal frame to the backside of the door skin on top of the adhesive.

This construction technique results in a minimal or non-discernible gap between the glass and the door skin, allowing for a flush look for the appliance door.

This construction technique also results in a metal-to-metal-to-glass adhesion, providing greater structural strength to appliance doors having large viewing windows and minimal surface area for affixing glass to the door skin.

Various other objects, features, aspects, and advantages of the present invention will become more apparent to those skilled in the art upon review of the following detailed description of preferred embodiments of the invention and accompanying drawings in which like numerals represent like components.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Throughout this disclosure, the terms top, bottom, front, back, left and right may be used. These terms are only intended to provide relational orientation with respect to one another. For example, any two opposed sides can be a right side and a left side and by changing to an opposed viewpoint, right versus left will be changed. Thus, top, bottom, front, back, left and right should not be considered limiting and are used only to distinguish their relationship to one another.

Figure 1:
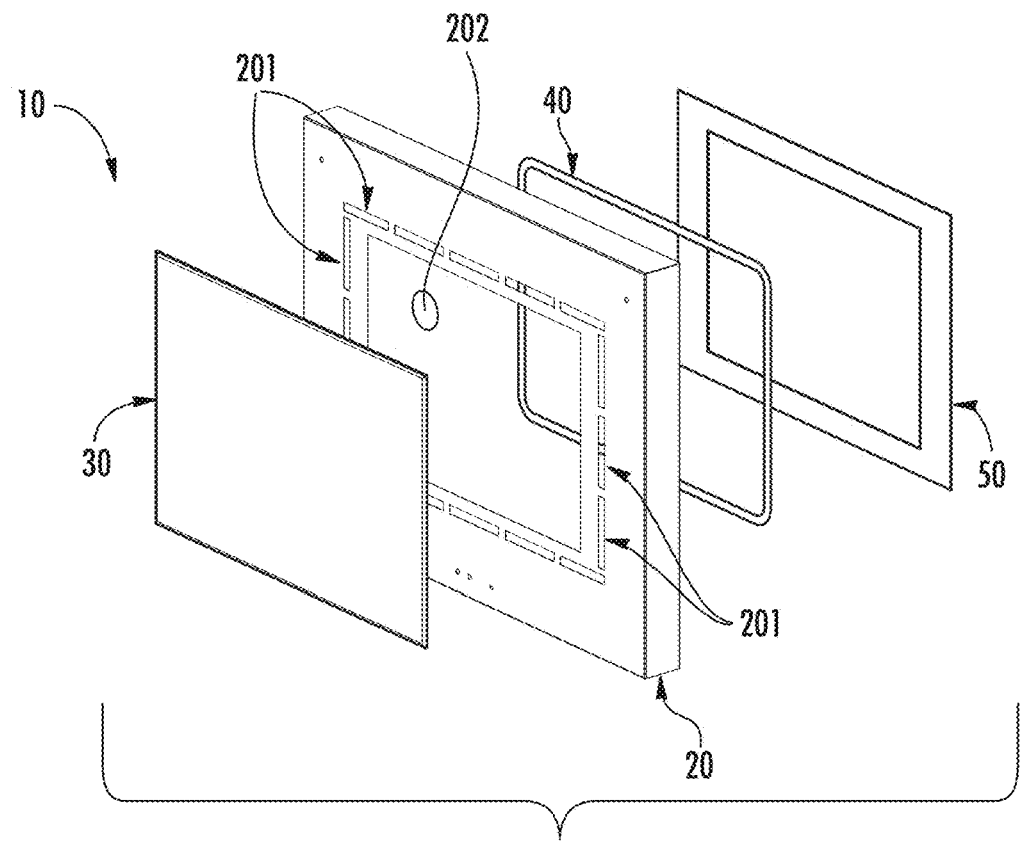
FIG. 1 is a perspective, front view of an appliance door panel constructed in accordance with this disclosure.

FIG. 1 illustrates a front perspective, blown-apart view of an appliance door panel 10. Appliance door panel 10 may be a component of any manner of appliance door, for example, an oven or range door.

The appliance door panel 10 has a door skin 20. The door skin is constructed out of metal; however, any other suitable material can be used.

The door skin has a cutout or viewing window 202 that may allow for viewing contents of the appliance when the appliance door is closed. The viewing window may be configured in a variety of sizes, dimensions, and/or shapes to maximize viewing and/or to minimize weight of the door skin.

The door skin has a plurality of cut outs or slots 201 which perforate the door skin.

Attached to the outer, front side of the door skin is a glass panel 30, the glass panel being the same, similar, or approximate size as the viewing window. The glass panel can be constructed out of glass, transparent ceramic, or any other suitable material.

During assembly of the appliance door panel a continuous bead of adhesive 40 is applied following the path of the slots on the back side of the door skin.

Attached to the inner, back side of the door skin is a metal frame 50. The metal frame is positioned so as to cover the adhesive-filled slots in the door skin. In an exemplary embodiment the metal frame functions as an infrared ("IR") shield. The metal frame is constructed out of metal; however, any other suitable material can be used.

The adhesive in the slots of the door skin results in the glass panel being adhered to both the door skin and the metal frame. Additionally, the adhesive in the slots of the door skin as well as the adhesive between the slots on the back side of the door skin result in the metal frame being adhered to the door skin. As a result, a metal-to-metal-to-glass adhesive bond is created bonding the metal frame to the door skin to the glass panel.

This metal-to-metal-to-glass construction results in a stronger bond with increased structural integrity than metal-to-glass construction. Furthermore, the metal-to-metal-to-glass construction is consistent and not partial due to the metal frame overlapping the adhesive-filled slots which serve as bonding points for the glass panel. The metal-to-metal-to-glass construction also results in the glass panel being mounted flush to the front side of the door skin, reducing or eliminating any gap between the glass panel and the door skin.

Figure 2:
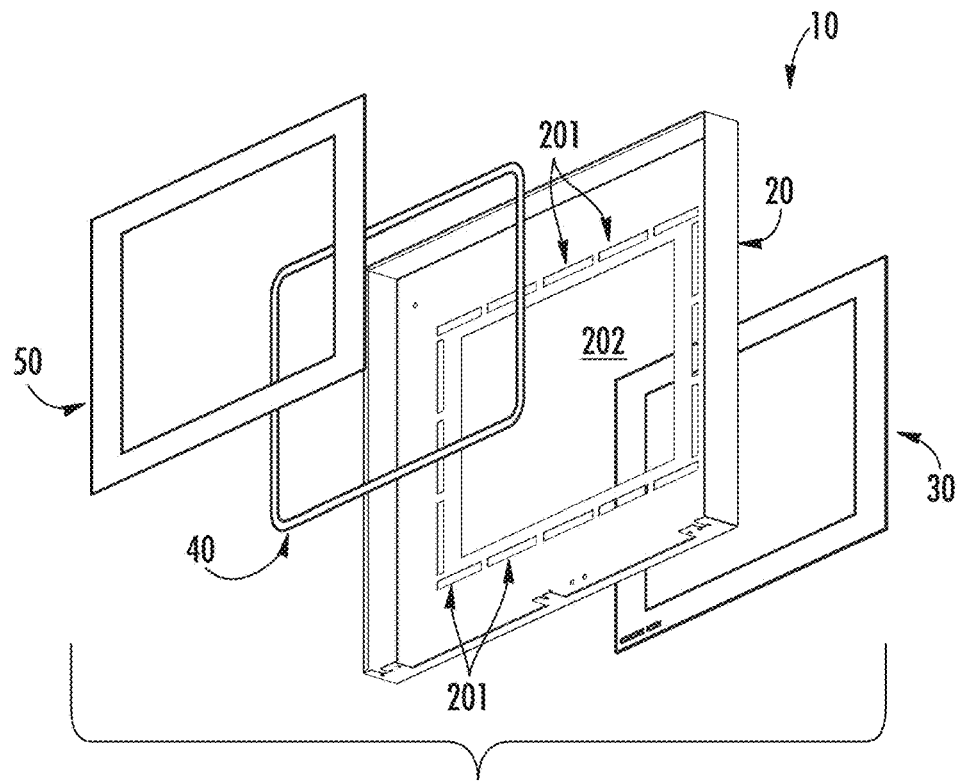
FIG. 2 is a perspective, rear view of an appliance door panel constructed in accordance with this disclosure.

FIG. 2 illustrates a rear perspective, blown-apart view of the appliance door panel 10. As illustrated in FIG. 2 the door skin 20 is sandwiched between the metal frame 50 and the glass panel 30, with the metal frame overlapping the slots 201 in the door skin.

Example Procedures.

The following discussion describes techniques for constructing an appliance door panel with a metal-to-metal-to-glass bond. The procedures are shown as a set of blocks that specify operations to be performed by one or more persons or one or more devices and are not necessarily limited to the orders shown for performing the operations by the respective blocks. In portions of the following discussion, reference will be made to FIGS. 1 and 2 and respective reference numbers.

Figure 3:
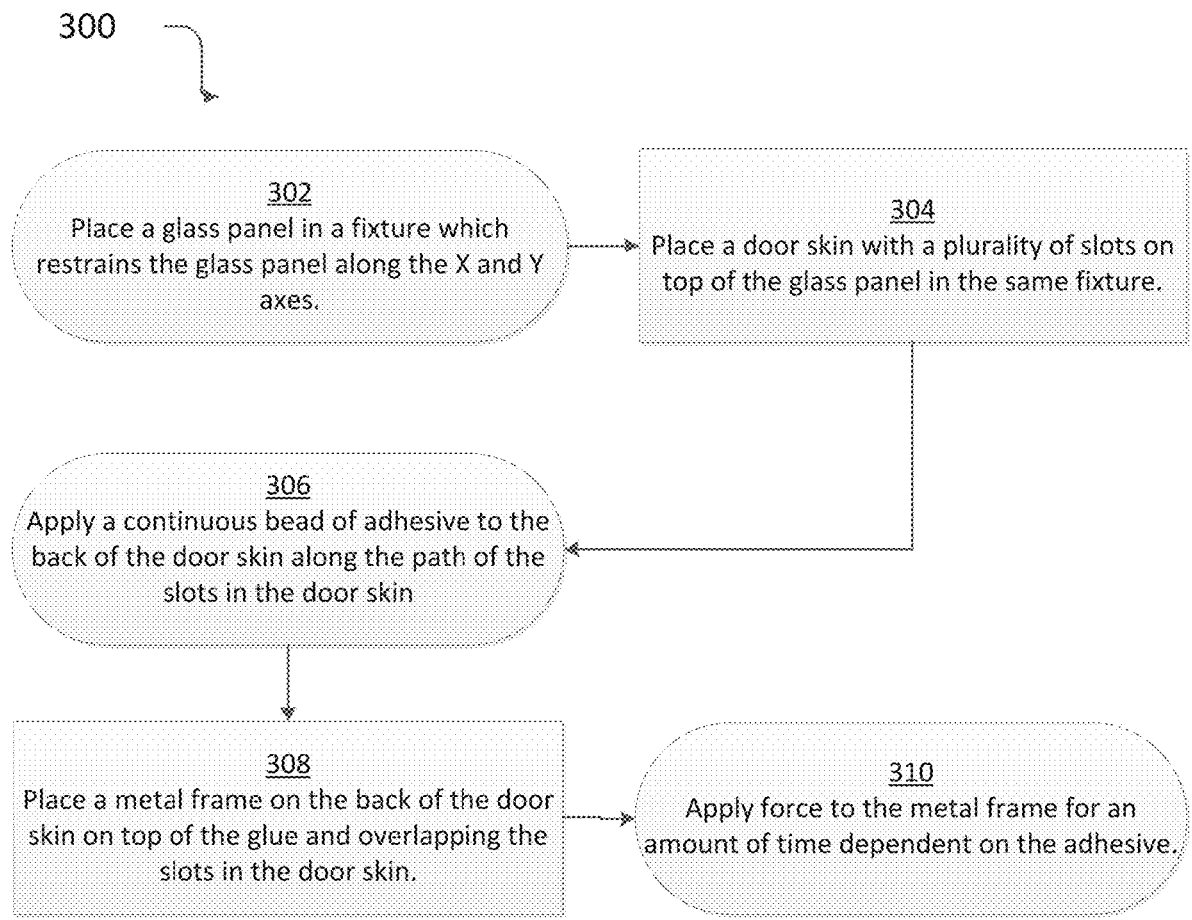
FIG. 3 is a flow diagram depicting a procedure in an example implementation in which an appliance door panel is constructed.

FIG. 3 depicts a procedure 300 in an example implementation in which an appliance door panel with a metal-to-metal-to-glass bond is constructed.

At 302 a glass panel (30) of similar or identical size to a door skin viewing window (202) is placed in a fixture which restrains it along the X and Y axes.

At 304 a door skin (10) having a plurality of perforated or cut slots (201) is placed on top of the glass panel in the same fixture, the fixture constraining both the glass panel and the door skin.

At 306 a continuous bead of adhesive is applied to the back of the door skin along the path of the slots in the door skin. This adhesive may be a silicone-based adhesive or glue, however any other suitable material can be used. The adhesive may be applied manually or by an automatic process.

After the adhesive is applied, at 308 a metal frame 50 is placed on the back of the door skin on top of the glue and overlapping the slots in the door skin. A fixture may be used to align the metal frame, or another process may be used that ensures consistent placement of the metal frame.

After the metal frame is in position at 310 a press is used to apply force to the metal frame. This force is applied for an amount of time dependent on the properties of the adhesive used.

As a result of this process the metal frame, door skin, and glass panel are adhered in a metal-to-metal-to-glass bond via the plurality of slots in the door skin.

While the present technology has been described in connection with several practical examples, it is to be understood that the technology is not to be limited to the disclosed examples, but on the contrary, is intended to cover various modifications and equivalent arrangements included within the spirit and scope of the technology.

What is claimed is:

1. An oven door panel for an appliance oven door, the oven door panel comprising:
   an oven door skin, the oven door skin having a plurality of cut-out slots;
   a window in the oven door skin;
   a glass panel mounted to a first side of the oven door skin; and
   a metal frame on a second side of the oven door skin opposite of the glass panel,
   wherein the glass panel and the metal frame are directly bonded to the other through at least one of the plurality of cut-out slots.

2. The oven door panel of claim 1, wherein the glass panel is mounted to the first side of the oven door skin via an adhesive.

3. The oven door panel of claim 2, wherein the adhesive is a silicon-based adhesive.

4. The oven door panel of claim 1, wherein the frame is mounted to the second side of the oven door skin via an adhesive.

5. The oven door panel of claim 1, wherein the glass panel is mounted flush to the first side of the oven door skin.

6. The oven door panel of claim 1, wherein there is no gap between the glass panel and the first side of the oven door skin.

* * * * *